US005991352A

United States Patent [19]
Taylor

[11] Patent Number: 5,991,352
[45] Date of Patent: Nov. 23, 1999

[54] METHOD FOR DETERMINING CORROSION SUSCEPTIBILITY OF NUCLEAR FUEL CLADDING TO NODULAR CORROSION

[75] Inventor: Dale Frederick Taylor, Schenectady, N.Y.

[73] Assignee: General Electric Company, Schenectady, N.Y.

[21] Appl. No.: 09/050,214

[22] Filed: Mar. 30, 1998

[51] Int. Cl.$^6$ .................................................. G21C 19/00
[52] U.S. Cl. ........................ 376/260; 376/277; 376/305; 436/6; 436/908
[58] Field of Search ................................. 376/260, 277; 436/6, 908

[56] References Cited

U.S. PATENT DOCUMENTS

| | | | |
|---|---|---|---|
| 2,987,352 | 6/1961 | Watson | 308/241 |
| 3,097,094 | 7/1963 | Rubenstein et al. | 75/177 |
| 3,556,870 | 1/1971 | Debray et al. | 148/6.3 |
| 3,615,885 | 10/1971 | Watson | 148/6.3 |
| 4,212,686 | 7/1980 | Lunde et al. | 148/11.5 F |
| 4,440,862 | 4/1984 | Cheng et al. | 436/6 |
| 4,986,957 | 1/1991 | Taylor | 376/417 |
| 5,130,080 | 7/1992 | Niedrach | 376/305 |
| 5,130,081 | 7/1992 | Niedrach | 376/305 |
| 5,135,709 | 8/1992 | Andresen et al. | 376/305 |
| 5,164,152 | 11/1992 | Kim et al. | 376/305 |
| 5,436,947 | 7/1995 | Taylor | 376/416 |

FOREIGN PATENT DOCUMENTS

| | | | |
|---|---|---|---|
| 57-20644 | 2/1982 | Japan | 436/908 |
| 587371 | 1/1978 | U.S.S.R. | 436/908 |

OTHER PUBLICATIONS

"Zirconium in the Nuclear Industry", by Ronald B. Adamson et al., ASTM Special Technical Publication 939, Seventh International Symposium sponsor by ASTM Committee B–10 on Reactive and Refractory Metals, Strasbourg, France, Jun. 24–27, 1985, pp. 419 and 423.

*Primary Examiner*—Michael J. Carone
*Assistant Examiner*—Jack Keith
*Attorney, Agent, or Firm*—Tyler Maddry; Noreen C. Johnson

[57] ABSTRACT

A method for determining the susceptibility of a sample of Zircaloy alloy to nodular corrosion. A specimen of such Zircaloy sample is annealed at a temperature within a temperature range bounded at its upper limit by the temperature $T_c$ being the temperature at equilibrium wherein sufficient solute would exist in the ($\alpha$-matrix of the particular zircaloy to resist nodular corrosion, and bounded by a lower temperature, such temperature being the temperature of the ($\alpha$+precipitate)/($\alpha$+$\beta$+precipitate) transus for the particular Zircaloy sample. For Zircaloy-2, such temperature range is from approximately 825° C. to 841° C. The specimen is maintained at such selected temperature within such temperature range for a measured period, and subsequently exposed to steam at a fixed temperature and pressure for a fixed time. If nodular corrosion does not appear the above steps are repeated, but on each different specimen increasing the measured time period until a last measured time period is obtained when nodular corrosion first appears on a specimen. The length of the last measured time period is used as an indicator of the sample's resistance to nodular corrosion, and thus conversely its susceptibility to nodular corrosion.

10 Claims, 3 Drawing Sheets

FIG. 2

EXPERIMENTAL RESULTS FOR DETERMINATION OF T AT EQUILIBRIUM
COOLING REGIME 1010°C - 840/830-T (°C) (hold @T (°C) for t hours)

| t hr | 840 | 839 | 838 | 837 | 836 | 835 | 834 | 833 | 832 | 831 | 830 | 829 | 828 | 827 | 826 | 825 | 824 | 823 | 822 | 821 | 820 | 819 | 818 |
|---|---|---|---|---|---|---|---|---|---|---|---|---|---|---|---|---|---|---|---|---|---|---|---|
| 0 | - | - | - | - | - | - | - | - | x | x | x | x | x | x | x | x | x | x | x | x | x | x | x |
| 2 | - | - | - | - | - | - | - | - | - | - | - | x | x | x | ✓ | ✓ | ✓ | ✓ | - | ✓ | - | ✓ | - |
| 5 | - | - | - | - | - | - | - | ✓ | - | - | - | - | - | x | ✓ | ✓ | ✓ | - | ✓ | - | ✓ | ✓ | ✓ |
| 18 | - | - | - | - | x | x | x | ✓ | ✓ | ✓ | - | ✓ | ✓ | ✓ | - | ✓ | - | ✓ | ✓ | - | ✓ | ✓ | - |
| 48 | x | x | x | ✓ | ✓ | ✓ | ✓ | - | - | - | - | - | - | - | - | - | - | - | - | - | - | - | - |

| t hr | 817 | 816 | 815 | 814 | 813 | 812 | 811 | 810 | 809 | 808 |
|---|---|---|---|---|---|---|---|---|---|---|
| 0 | x | x | x | x | x | ✓ | - | - | - | ✓ |
| 2 | ✓ | - | ✓ | - | - | - | - | ✓ | - | - |
| 5 | - | - | - | - | - | - | - | - | - | - |
| 18 | ✓ | - | - | - | - | - | - | - | - | - |
| 48 | - | - | - | - | - | - | - | - | - | - |

✓ = Nodular Corrosion Present
x = No Nodular Corrosion Present
- = Denotes No Test Sample Obtained 5,991,352

METHOD FOR DETERMINING CORROSION SUSCEPTIBILITY OF NUCLEAR FUEL CLADDING TO NODULAR CORROSION

FIELD OF THE INVENTION

The invention relates to a metallurgical process involving zirconium alloys, and more particularly to a process for treating a zirconium alloy to allow determination of relative susceptibility of such zirconium alloy to nodular corrosion when exposed to high pressure steam.

BACKGROUND OF THE INVENTION

Nuclear reactors utilize water/steam as a coolant for the reactor as well as a source of energy to power steam turbines to thereby provide electrical energy. Nuclear reactors typically have their nuclear fissionable material contained in sealed cladding tubes, generally of a zirconium alloy, for isolation of the nuclear fuel from the water/steam. Zirconium and its alloys are widely used as nuclear fuel cladding since they advantageously possess low neutron absorption cross-sections, and at temperatures below about 398° C. (the approximate core temperature of an operating nuclear reactor), are non-reactive and importantly possess high corrosion resistance relative to other metal alloys in the presence of de-mineralized water or steam. Two widely used zirconium alloys ("Zircaloys") are "Zircaloy-2" and "Zircaloy-4", trade names of Westinghouse Electric Corporation for zirconium alloys of the above chemical compositions. Zircaloy-2, a Zr-Sn-Ni-Fe-Cr alloy, is generally comprised (by weight) of approximately 1.2–1.7% tin, 0.13–0.20% iron, 0.06–0.15% chromium and 0.05–0.08% nickel. Zircaloy-4 has essentially no nickel, and about 0.2% iron, but is otherwise substantially similar to Zircaloy-2. Zircaloy-2 has enjoyed widespread use and continues to be used at present in nuclear reactors. Zircaloy-4 was developed as an improvement to Zircaloy-2 to reduce problems with hydriding, which causes Zircaloy-2 to become brittle when cooled to ambient temperatures (i.e. when the reactor is shut down) after absorbing hydrogen at higher temperatures.

Zirconium alloys are among the best corrosion resistant materials when exposed to steam at reactor operating temperatures (less than 398° C., typically 290° C.) in the absence of radiation from nuclear fission reactors. The corrosion rate in absence of neutron bombardment is very low and the corrosion product is a uniform, black $ZrO_2$ oxide film/layer which forms on exterior surfaces of Zircaloy exposed to high temperature steam (uniform corrosion). The black oxide layer of $ZrO_2$ usually contains a small (non-stoichiometric) excess of zirconium, and as such, it contains excess electrons giving it a black or gray color. It is also highly adherent to zirconium or Zircaloy surfaces exposed to steam.

Despite such relatively high corrosion resistance, when Zircaloys are used as cladding and exposed to high neutron flux in nuclear reactors, corrosion rates are generally increased, and cladding corrosion does become a potential problem in Pressurized Water Reactors (PWR's) and particularly Boiling Water Reactors (BWR's), where corrosion occurs in two formats, namely increased uniform corrosion as mentioned above, and also nodular corrosion. Nodular corrosion is a highly undesirable, white, stoichiometric $ZrO_2$ oxide layer ("bloom") which forms on the surface of the cladding. It tends to form as small patches ("nodules" or "pustules") on the surface of Zircaloys. Today, it is increasingly common to operate nuclear reactors at high "burn-up" (i.e. to nearly complete consumption of the nuclear fuel). Under these conditions, the cladding is exposed to neutron flux for long periods which generally tends to increase the severity of nodular corrosion. Such increased nodular corrosion not only shortens the service life of the tube cladding (since when concentrated nodular corrosion acts in conjunction with certain contaminants—such as copper ions—localized spalling and ultimately penetration of the cladding can occur), but also produces a detrimental effect on the efficient operation of the reactor. In particular, the white $ZrO_2$, being less adherent than black $ZrO_2$, is prone to spalling or flaking away from the tube into the reactor water. On the other hand, if the white nodular corrosion product does not spall away, a decrease in heat transfer efficiency through the Zircaloy tube into the water cooling medium occurs when the less-dense white $ZrO_2$ oxide layer covers an increasingly large portion of the Zircaloy tube exterior surface. Thus, nodular corrosion can become a significant problem for Zircaloy cladding in situations where Zircaloy tube cladding is left in the nuclear reactor for longer periods in conditions of high "burn-up".

Zircaloys used in cladding for nuclear fuel rods are generally subject during their manufacture to a variety of heat treatments and anneals during the formation of the tubular cladding. It is known that the various heat treatments and quenching procedures used in forming a Zircaloy billet, and the various anneals and cold-working thereafter to form the Zircaloy tube cladding, all have an effect on the particular Zircaloy tubing's ability to resist nodular corrosion, with some Zircaloys able to withstand nodular corrosion better than others despite both being of identical chemical composition. For example, equiaxed Zircaloy-2, heated to 1010° C. and slow-cooled at a rate of 18° C./hr. to 600° C. and thereafter quenched, exhibits a high susceptibility to nodular corrosion under the standard steam test (510° C., 1500 psig, 24 hr.). Paradoxically, the same material, if simply quenched from 1010° C., or if heated to only 950° C. and cooled at the same rate of 18° C./hr. to 600° C. and thereafter quenched, exhibits high resistance to corrosion under the same standard steam test.

Since the actual physical transformations which occur within the Zircaloy composition itself during such processes, in particular during annealing and quenching, were largely not understood, it was prior to this invention difficult to predict what a particular Zircaloy sample's resistance to nodular corrosion will be relative to, for example, another Zircaloy alloy of identical chemical composition but having a different heat treatment and annealing history.

It is prohibitively difficult, time consuming, and expensive to employ existing nuclear reactors and the nuclear reactor environment itself as a means of measuring a particular Zircaloy's tubing sample's resistance to nodular corrosion. At the present time, the standard high-pressure steam test (510° C./1500 psig/24 hr.), or a variation of it, is the only practical means of evaluating the susceptibility to nodular corrosion and predicting in-reactor performance. Using such test, a specimen of Zircaloy tubing is exposed to 510° C. steam under 1500 psig for a period of 24 hours. The presence of nodules of white $ZrO_2$ oxide on exposed surfaces of such Zircaloy indicate that such Zircaloy material would have a low resistance to nodular corrosion if such specimen were to be used in a nuclear reactor under the conditions as mentioned above. Unfortunately, while the standard high pressure steam test is reliable for determining if Zircaloy tubing has a high susceptibility to nodular corrosion and is accurate in indicating which material will definitely, if exposed to high temperature water/steam in a nuclear reactor at the temperatures indicated above, prove susceptible to nodular corrosion, the converse is not necessarily true. In particular, simply because a Zircaloy in the standard high-pressure steam test passes such test (i.e. fails to show susceptibility to nodular corrosion), it is known that such does not necessarily mean that such Zircaloy will have lengthy immunity to nodular corrosion when exposed to high temperature water/steam in the nuclear reactor environment.

For the above reasons, a test procedure which accurately predicts a Zircaloy sample's susceptibility to nodular corrosion without having to actually expose the samples to a neutron flux environment, is clearly needed.

SUMMARY OF THE INVENTION

The present invention involves an understanding of known metallurgical structures of Zircaloys, namely $\alpha$ and $\beta$ crystal lattice structures which are present, either individually or in combination, over certain temperature ranges during annealing of Zircaloy.

The specific $\alpha$ or $\beta$ metallurgical structures which are present over various temperature ranges are commonly depicted in time-temperature plots referred to as isothermal transformation diagrams ("TTT" diagrams) specific to each Zircaloy. In particular, such diagrams refer to a "$\beta$ phase", which for zirconium alloys is a body-centered cubic crystal lattice structure of crystalline zirconium, which exists at temperatures above about 825° C., and exclusively exists at temperatures above about 985° C. Such diagrams further refer to the $\alpha$-matrix phase, or "$\alpha$ phase". The $\alpha$-matrix phase of a Zircaloy-2 comprises a close-packed hexagonal lattice structure, which exists exclusively at temperatures less than approximately 825° C. Both the $\alpha$ and $\beta$ phases of Zircaloys may simultaneously each exist at temperatures in the range of about 825–985° C.

Precipitates (herein referred to collectively by the Greek letter $\chi$) also exist within Zircaloys, and are generally particles within the alloy containing higher concentrations of the alloying elements Fe and Cr or Ni. These alloying elements, which exist in solution at low concentrations in the $\alpha$ and $\beta$ matrices, generally start to precipitate out of solution and form precipitates below temperatures of about 855° C. Precipitates found in Zircaloys are represented by chemical formulas such as $Zr(Fe, Cr)_2$ and $Zr_2(Fe, Ni)$.

For a given temperature less than about 855° C. [i.e. for a given temperature less than the temperature of the $(\alpha+\beta)/(\alpha+\beta+\text{precipitate})$ transus on the TTT diagram], at equilibrium the concentration of alloying elements Fe, Cr and Ni (i.e. solute) in the $\alpha$-matrix will be no higher than their solubility limit within such $\alpha$ matrix at the given temperature. Lowering the temperature causes such solute to precipitate out of the $\alpha$-matrix into precipitates and/or to migrate to remaining $\beta$ phase, if $\beta$ phase exists at such temperature.

It is postulated that Zircaloys derive their immunity to nodular corrosion from solute present in the $\alpha$-matrix, the $\alpha$-matrix being the metallurgical structure present at the temperature at which nuclear reactors operate (i.e. in the 200° C.–390° C. range). Zircaloys which are rapidly cooled from a relatively high temperature (e.g. 950° C.) [when large amounts of solute may be present in such $\alpha$-matrix and where such solutes remain trapped in such $\alpha$-matrix in a supersaturated condition when subsequently rapidly cooled] have high resistance to nodular corrosion, which lends support to such postulate. Likewise supporting such postulate is evidence that slowly cooling a Zircaloy from temperatures commencing at 950° C., whereby the concentration of solute in such $\alpha$-matrix is thereby given the chance to leave such matrix during the cooling period by, for example, precipitating into precipitates, produces a Zircaloy having an $\alpha$-matrix phase at temperatures of 200° C.–390° C. which is highly sensitive to nodular corrosion.

It is now believed, supported by experimental results disclosed herein, that there exists a critical concentration $C_c$ of solute within such $\alpha$-matrix whereby $\alpha$-matrices having concentrations of solute therein above such critical concentration $C_c$ will possess an immunity to nodular corrosion, and $\alpha$-matrices having solute concentrations below such critical concentration $C_c$ will exhibit high susceptibility to nodular corrosion when exposed to steam. Experimental tests conducted by the inventor have allowed the inventor to conclude the critical concentration $C_c$ of solute is reached, when at equilibrium, at a specific critical temperature $T_c$ which, for Zircaloys, exists in the region below the $(\alpha+\beta)/(\alpha+\beta+\chi)$ transus (ie. below about 855° C.) but above the $(\alpha+\beta+\chi)/(\alpha+\beta\chi)$ transus (i.e. above about 825° C.), namely in the $(\alpha+\beta+\chi)$ region on the TTT diagram. In particular, experimental results conducted with Zircaloy-2 indicate this critical temperature $T_c$ to be in the range of 837–841° C., and likely about 840° C. At such temperature the $\alpha$-matrix containing solute of a concentration $C_c$ exists in equilibrium with solute-saturated $\beta$-phase.

All Zircaloys, even if containing supersaturated $\alpha$ and being initially immune to nodular corrosion, will eventually sensitize to nodular corrosion by a process known as "Ostwald ripening", wherein solutes gradually diffuse from the $\alpha$-matrix and precipitates $\chi$ grow larger in size, resulting in a loss of supersaturation of solute in the $\alpha$-matrix. The higher the level of supersaturation that initially exists in the $\alpha$-matrix, the longer the time necessary for the solute in the matrix to lose its supersaturation, and consequently the more resistant the Zircaloy would be to nodular corrosion. Accordingly, while the time taken for the $\alpha$-matrix at low temperatures (200–400° C.) to lose its supersaturation and drop its concentration of solute below $C_c$ (at which point nodular corrosion would occur), and measuring such time period for it to do so, would be one means of measuring a Zircaloys resistance to nodular corrosion, the time periods involved for this process to take place at low temperatures are very lengthy, taking thousands of hours.

Using the concept of $T_c$, it is now realized that heating a zirconium alloy to an optimum temperature slightly below $T_c$ for a measured time period, and thereafter exposing such alloy to steam to ascertain if nodular corrosion occurs, will give the speediest means of determining a specimen's susceptibility to nodular corrosion. Clearly, heating such zirconium alloy to a temperature above $T_c$ would allow the solute level in the $\alpha$-matrix to exceed the $C_c$, thereby immunizing the specimen against nodular corrosion if such specimen were subsequently quickly cooled. Conversely, heating such alloy to a temperature substantially less than $T_c$, for example less than the $(\alpha+\chi)(\alpha+\beta+\chi)$ transus which for Zircaloy is about 825° C., would result in less than optimum speed of sensitization, since sensitization will occur most quickly proximate to, but slightly less than, $T_c$. Accordingly, it is now realized that the optimum means of measuring a Zircaloy's susceptibility to nodular corrosion is to successively anneal various specimens of such alloy over successively longer periods of time until corrosion is observed when such specimen (after annealing) is subsequently exposed to steam, and using such time interval as a means of measuring that particular Zircaloy alloy's initial susceptibility to nodular corrosion.

Accordingly, in order to provide a reliable test for predicting susceptibility of a Zircaloy sample to nodular corrosion, without having to expose such sample for a lengthy period in to the steam environment present in a nuclear reactor, and without having to wait inordinate amounts of time at low temperatures to determine if a sufficient resistance to nodular corrosion exists, the present invention in one of its broad embodiments comprises a method for heating a particular specimen of a Zircaloy sample to an optimal temperature range, namely just below a critical temperature at which temperature at equilibrium conditions sufficient solute would have existed in the $\alpha$-matrix to resist corrosion, for a measured time period, and subsequently exposing such specimen to steam at a fixed temperature, pressure and for a given time, and determining if there is nodular corrosion after such given time period. In the event the sample does not indicate corrosion, the process is repeated using another specimen from said sample, but increasing each time the measured time period, until nodular corrosion appears. The resultant measured time period is an indicator of the samples' resistance to nodular corrosion. In particular, if a short measured time period is encountered (i.e. <25 hours), the initial sample is close to being susceptible to nodular corrosion. Conversely, if a long measured time period (>75 hours) is encountered, the Zircaloy sample is relatively immune to nodular corrosion.

Accordingly, in one of its broad embodiments, the method of the present invention comprises:

i) heating a specimen of selected Zircaloy sample to a selected temperature within a temperature range just below a temperature $T_c$ at which temperature at equilibrium conditions sufficient solute would have existed in the $\alpha$-matrix of the particular Zircaloy to resist corrosion, but above the temperature of the $(\alpha+\text{precipitate})/(\alpha+\beta+\text{precipitate})$ transus for the particular Zircaloy sample;

ii) maintaining said specimen at said selected temperature within said temperature range for a measured time period;

iii) exposing said specimen to steam at a fixed temperature and pressure for a fixed time, and determining if there is nodular corrosion;

iv) if nodular corrosion does not exist, successively repeating steps i)–iii), but on each repetition increasing the measured time period until a last measured time period is obtained when nodular corrosion first appears on the specimen; and v) using said measured time period when nodular corrosion first appeared on the specimen as an indication of the selected Zircaloy sample's resistance to nodular corrosion.

The critical equilibrium temperature $T_c$ for Zircaloy-2 is approximately 837–841° C. Accordingly, in a preferred embodiment of the invention, where such test is employed to determine the susceptibility of a specimen of a Zircaloy-2 alloy to nodular corrosion, the heating of such specimen is to a temperature below the $T_c$, namely below 841° C., but above about 825° C., namely the temperature above the $(\alpha+\chi)$ $(\alpha+\beta+\chi)$ transus on the TTT diagram.

The step in the above process comprising exposing the specimen to steam at a fixed temperature and pressure for a fixed time, and determining if there is corrosion, may utilize any arbitrarily-selected temperature, pressure and time which will allow nodular corrosion to occur within the fixed time period on a Zircaloy specimen which is known to be susceptible to nodular corrosion. Typically the selected temperature and pressure ranges would be in the temperature and pressure ranges which cause nodular corrosion in a reasonable time, say 24 hours. However, it is recognized that a standardized test, utilizing steam at a temperature of 450° C.–600° C. (typically 510° C.), and pressure of 1000–2000 psig, will result in shorter time periods (24 hours) to indicate susceptibility to nodular corrosion in specimens known to be susceptible to nodular corrosion. Accordingly, in a preferred embodiment of the invention the step in the above method comprises exposing a Zircaloy specimen to steam at 510° C., at 1500 psig for a period of 24 hours.

BRIEF DESCRIPTION OF THE DRAWINGS

In considering the detailed description of the embodiment of the invention which follows, reference is to be had to the attached drawings in which:

FIG. 2 is a tabulation of the results of various experiments, as more fully described herein, wherein equiaxed $\alpha$ Zircaloy-2 was furnace cooled from 1010° C. to 840/830° C., and thereafter slow-cooled to a selected temperature ranging from 840–808° C., and held at such temperature for a time "t", and thereafter quenched and exposed to steam at 510° C., 1500 psig for 24 hours to determine if nodular corrosion occurred.

DETAILED DESCRIPTION OF THE INVENTION

Figure 1:
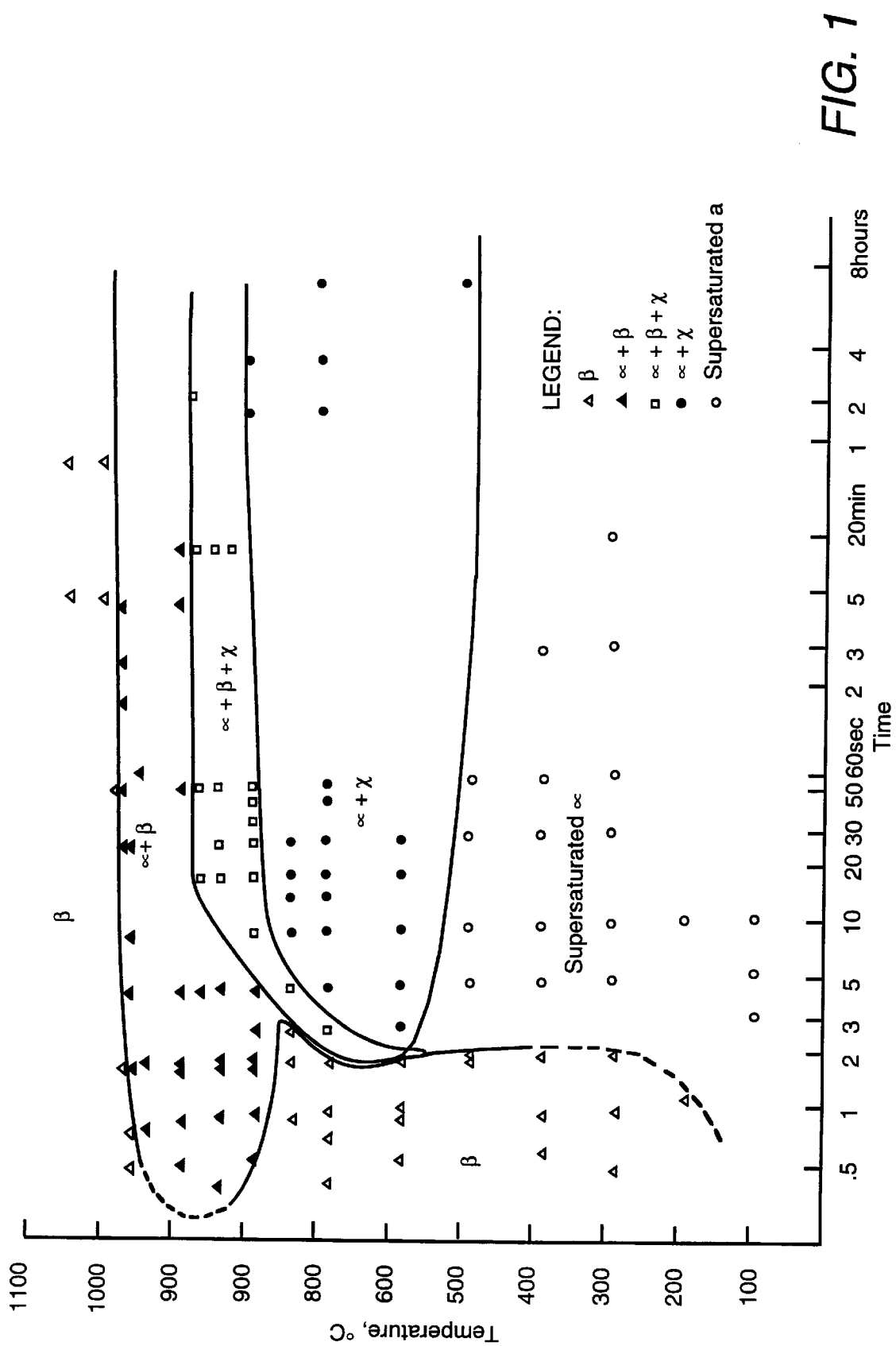
FIG. 1 is a typical isothermal transformation diagram for Zircaloy-2 after treatment to 1050° C., showing the microscopic crystalline structures present over various ranges (ref. G. Ostberg, Jerkontorets Annaler, 145 (1961), p. 119)

FIG. 1 shows a typical TTT diagram for a Zircaloy-2 containing by weight percent 1.5% Sn, 0.15% Fe, 0.1% Cr, and 0.5% Ni. FIG. 1 shows the microstructural phases of Zircaloy present over various temperature ranges, as a function of cooling time, commencing with Zircaloy in the $\beta$ phase at 1050° C.

The method of the present invention for measuring the corrosion susceptibility of a sample of Zircaloy involves heating a specimen of the Zircaloy sample to a particular temperature just below a temperature $T_c$ within the $\alpha+\beta+\chi$ phase range (the temperature range for such phase range, as may be seen from the TTT diagram of FIG. 1 for the particular Zircaloy, extending from approximately a lower limit of 790° C.–800° C. to an upper limit of approximately 855° C.). By heating such specimen as close to but below $T_c$, and holding it at such temperature for a measured time until nodular corrosion occurs using a standard steam test, the specimen will be sensitized as quickly as physically possible to nodular corrosion. The measured time taken for such specimen to become sensitized to nodular corrosion is a measure of the Zircaloy sample's degree of susceptibility to nodular corrosion.

At equilibrium conditions, the solute concentration in the $\alpha$-zirconium matrix (one of the microstructural phases present in the $\alpha+\beta+\chi$ region, the other phases being the $\beta$-matrix phase, and precipitates $\chi$) is relative to temperature. Increased temperature increases the $\alpha$-matrix's ability to hold therewithin increased quantities of solute, while lowering the temperature reduces the solute concentration within the $\alpha$-matrix, causing solute to diffuse or precipitate out of such $\alpha$-matrix. It is assumed that Zircaloy derives its immunity to nodular corrosion from solute present in the α-zirconium matrix. As a result of experimental results (see below), it is believed that there is a critical concentration $C_c$ of solute (and thus a corresponding temperature $T_c$ at which solute may exist in the necessary concentration within the α-matrix) necessary to resist nodular corrosion. Such experiments indicate the corresponding temperature $T_c$ for solute to exist in sufficient concentrations lies within the α+β+χ phase field, namely the phase field intermediate the (α+χ)/(α+β+χ) transus and the (α+β)/(α+β+χ) transus temperatures.

The experimentation used to determine the critical temperature $T_c$ for Zircaloy-2 is described below.

EXAMPLE 1

Zircaloy-2 nuclear fuel cladding with a zirconium barrier liner from Tubing Lot 2054-06 was used. Such cladding was obtained from parent ingot UX2700LB of commercial Zircaloy-2 having deliberate additions of Si and C, comprising (all weight percent) 1.28–1.31 Sn, 0.15–0.17 Fe, 0.09–0.10 Cr, 0.06–0.07 Ni, 0.12–0.13 O with less than 40 ppm N, 97–112 ppm Si, and 132–154 ppm C.

The annealing (heating) furnace used comprised a 25 mm diameter quartz tube that passed vertically through a bank of radially symmetric heating elements. A Type-304 stainless steel hook suspended a single 10 mm Zircaloy tubing segment in the center of the hot zone with its axis approximately horizontal. The tips of two 3 mm stainless steel thermocouple wells contacted the central portion of the tubing segment's external surface, one on each side of the suspension hook, and held the control and monitor thermocouples in close proximity to the Zircaloy specimen. Research-grade argon gas flowed at a constant rate of 60 cc/min through a getter of Zr-Ti alloy turnings at 800° C. before reaching the annealing zone of the quartz tube.

To strictly control furnace temperature, and to change it in accordance with temperature patterns described below, Programmable Research, Inc. Dimension Process Controller was used.

Heating generally comprised heating at a constant rate averaging about 40° C./min., to a maximum temperature. "Slow cooling" or "Slow cool", as referred to below, comprised a program control, and consisted of an allowed cooling rate of 0.005° C./sec. (18° C./hr.). "Furnace cooling" or "Furnace cool", as referred to below comprised a natural rate of cooling with the electrical power to the furnace shut off and the heating elements still in place, and varied from about 0.7° C./sec. to 0.6° C./sec. "Fan cooling" or "Fan cool" comprised opening the heating chamber and fan-cooling the quartz tube, which resulted in a quench rate that typically started at a rate of about 3° C./sec., but decreased to 1° C./sec. by the time the temperature reached 500° C. Changes from "slow cooling" to "furnace cooling" or "fan cooling" were abrupt and precise, but the transitions from "furnace cooling" to "slow cooling" required a gradual approach to avoid undershoot.

Numerous annular cuttings of the Zircaloy tubing were made as specimens. Each were subsequently etched with gentle agitation for 60 seconds in a solution of 10:9:1 by volume water, 70% nitric acid, 50% hydrofluoric acid. Each were then subjected to a similar but for each case individually different heating and cooling regime. In particular, such samples were each heated to a high temperature (in the β phase region on the TTT diagram, namely 1010° C.), furnace cooled to either 830° C. or 840° C. (the former if $T_f$<825° C., and the latter if $T_f$>825° C.), slow cooled to a temperature $T_f$, held at such temperature for a time "t", and thereafter fan-cooled. The hold times "t" used were t=0, 2, 5, 18 and 48 hrs. $T_f$ changed in increments of 3° C. for t=0 (no hold time before quenching (ie. fan cooling), 2° C. for t=2 hr., 5 hr., and 18 hr., and 1° C. for t=48 hr. The hold temperature $T_f$ used varied over the range 840° C. to 808° C. Accordingly, the heating/cooling pattern for each specimen utilized was "1010° C./furnace cool to 830° C. ($T_f$<825° C.) or 840° C. ($T_f$>825° C.)/slow cool to $T_f$/hold for t hr./fan cool."

Each of the specimens after fan cooling were re-etched, and exposed to a standard steam test. Such steam testing was by exposure to 10.4 MP (1500 psig) steam at 510° C. for 24 hr. A convection oven held the temperature throughout the interior of a one-liter Type 316 stainless steel autoclave constant to within ±1° C. A metering pump maintained the flow rate of 18 MΩ-cm water at 20 cc/min. after oxygen removal by nitrogen saturation under ambient conditions.

FIG. 2 is a tabulation of the results obtained, correlating the hold time at a plurality of temperatures to whether the specimens were made susceptible to nodular corrosion. As may be seen, as the time increased, the temperature at which nodular corrosion occurred moved from 812° C. (0 hours) to 838° C. (48 hours). It is believed the more lengthy time periods indicated a more equilibrated state wherein the excess solute within the (α-matrix had time to migrate out of such matrix if the solubility limit at such temperature did not permit it to remain in the α-matrix. Thus the temperature at which nodular corrosion existed moved closer to what is believed to be $T_c$, the critical temperature at equilibrium conditions, below which the solubility limit within the α-matrix is insufficient to maintain a concentration of solute sufficient to resist nodular corrosion.

Figure 3:
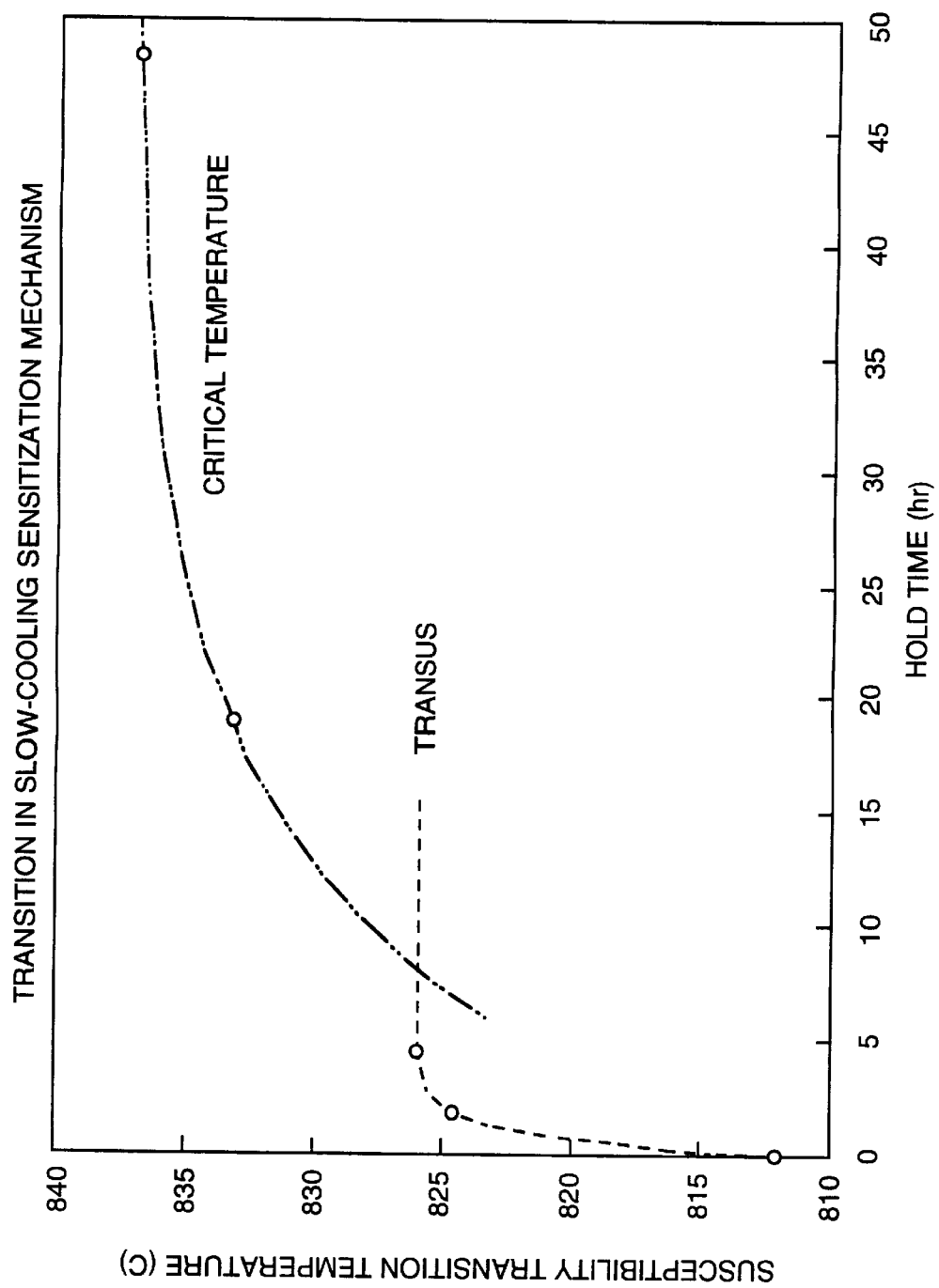
FIG. 3 is a plot of values for the highest temperature at which nodular corrosion was observed, taken from the results tabulated in FIG. 2.

FIG. 3 is a graphical representation of the onset temperatures of nodular corrosion obtained from the results obtained in FIG. 2, namely t=0 hrs. (812° C.), t=2 hrs. (825° C.), t=5 hrs. (826° C.), t=18 hrs. (833° C.), and t=48 hrs. (837° C.).

As may be seen from FIG. 3 as time increases, the temperature at which nodular corrosion occurs appears to approach a definite limit $T_c$, While the actual value of $T_c$ may be easily more precisely determined by further experimentation using more lengthy hold times, it is sufficiently easy from the values obtained to calculate a definite mathematic result for $T_c$.

More particularly, the simplest function that matches the asymptotic characteristics of these data is of the form $(1-e^{-x})$. Analytical representation requires three fitting parameters, $T_0$ (the intercept at zero hold time t=0), $T_L$ (the limiting value for long hold times, which will be $T_c$), and "j", an arbitrary co-efficient of the hold time. The resulting empirical equation:

$$T = T_L - (T_L - T_0)e^{-jt} \qquad (1)$$

required at least three points to determine those parameters. FIG. 3 shows two asymptotic curves, and thus three points are needed for each of the two curves. The first curve (having the three points 812° C., 825° C., and 826° C. (t=0 hr., 2 hr., and 5 hr.) is inapplicable in determining $T_c$, due to the intervening phase transformation. For the second curve, having only two points (T=833° C. at t=18 hr., and T=837° C. at t=48 hr.), it was necessary to supply a third point. Since the curves had to intersect between t=5 hrs. and t=18 hrs. with T=826–827° C., a third point could be selected.

Using three points:
1) T=826° C. 5 hrs. <t<18 hrs.

2) T=833° C. t=18 hrs.

3) T=837° C. t=48 hrs.

and solving for $T_L$ ($T_c$) in above equation (1) gives a value for $T_c$ in the range of 837–838° C., for the Zircaloy-2 specimen tested.

With such value of $T_c$, the method of the present invention can be practiced.

EXAMPLE 2

Two specimens of Zircaloy-2 were obtained, a first, known to have high susceptibility to nodular corrosion using the standard steam test, and a second comprising the very best equiaxed-α commercial Zircaloy-2, known to possess high resistance to nodular corrosion.

Using the method of the present invention, specimens of two samples were heated to 832° C., namely just above the (α+χ)/(α+β+χ) transus, but just below $T_c$ of 838–840° C. Each were held for 19 hours at such temperature, and subsequently fan-cooled and exposed to steam at 510° C., 1500 psig, for 24 hours. The first sample on visual inspection revealed classic nodular corrosion, while none was exhibited on a specimen from the second sample. Subsequent repetition of such test on additional specimens of the second sample only indicated nodular corrosion after a hold time of 100 hrs. at 832° C.

Although the disclosure describes and illustrates preferred embodiments of the invention, it is to be understood that the invention is not limited to these particular embodiments. Many variations and modifications will now occur to those skilled in the art. For definition of the invention, reference is to be made to the appended claims.

What is claimed is:

1. A method for determining the susceptibility of one or more samples of Zircaloy alloy to nodular corrosion wherein each sample may have a different annealing and/or heating treatment history and thus a different susceptibility to nodular corrosion, comprising:

i) heating a specimen of selected Zircaloy sample to a selected temperature within a temperature range just below a temperature $T_c$ at which temperature at equilibrium conditions sufficient solute would have existed in the α-matrix of the particular Zircaloy to resist nodular corrosion, but above the temperature of the (α+precipitate)/(α+β+precipitate) transus for the particular Zircaloy sample;

ii) maintaining said specimen at said selected temperature within said temperature range for a measured time period;

iii) exposing said specimen to steam at a fixed temperature and pressure for a fixed time, and determining if there is nodular corrosion;

iv) if nodular corrosion does not exist, successively repeating steps i)–iii), but on each repetition increasing the measured time period until a last measured time period is obtained when nodular corrosion first appears on the specimen; and v) using said measured time period when nodular corrosion first appeared on the specimen as an indication of the selected Zircaloy sample's resistance to nodular corrosion.

2. The method as claimed in claim 1, where the Zircaloy sample is Zircaloy-2.

3. The method as claimed in claim 2 wherein $T_c$ is approximately 840° C., and the temperature of the (α+precipitate)/(α+β+precipitate) transus is approximately 825° C.

4. The method as claimed in claim 3, said step of using said measured time period when nodular corrosion first appeared on the specimen further comprising comparing said measured time period with known values for said Zircaloy alloy to obtain an indication of that particular samples' resistance to modular corrosion in comparison to other Zircaloy samples of identical composition but different heat treatments.

5. The method as claimed in claim 3, wherein said step of exposing of said specimen to steam comprises exposing said specimen to steam at a substantially fixed temperature selected from the group of temperatures ranging from 450° C. to 600° C.

6. The method as claimed in claim 3, wherein said step of exposing said specimen to steam comprises exposing said specimen to steam at a substantially fixed temperature selected from the group of temperatures ranging from 450° C. to 600° C., for a period of time selected from the group of times ranging from 1 hour to 10 days.

7. The method as claimed in claim 3, wherein said step of exposing said specimen to steam comprises exposing said specimen to steam at a substantially fixed temperature selected from the group of temperatures ranging from 500–550° C., for a period of time selected from the groups of time ranging from 1 hour to 100 hrs.

8. The method as claimed in claim 3, wherein said step of exposing said specimen to steam comprises exposing said specimen to steam at approximately 510° C. for a period of approximately 24 hours.

9. The method as claimed in claim 6, wherein said steam is at a pressure of approximately 1000–2000 psig.

10. The method as claimed in claim 8, wherein said steam is at a pressure of approximately 1500 psig.

* * * * *